No. 782,882. Patented February 21, 1905.

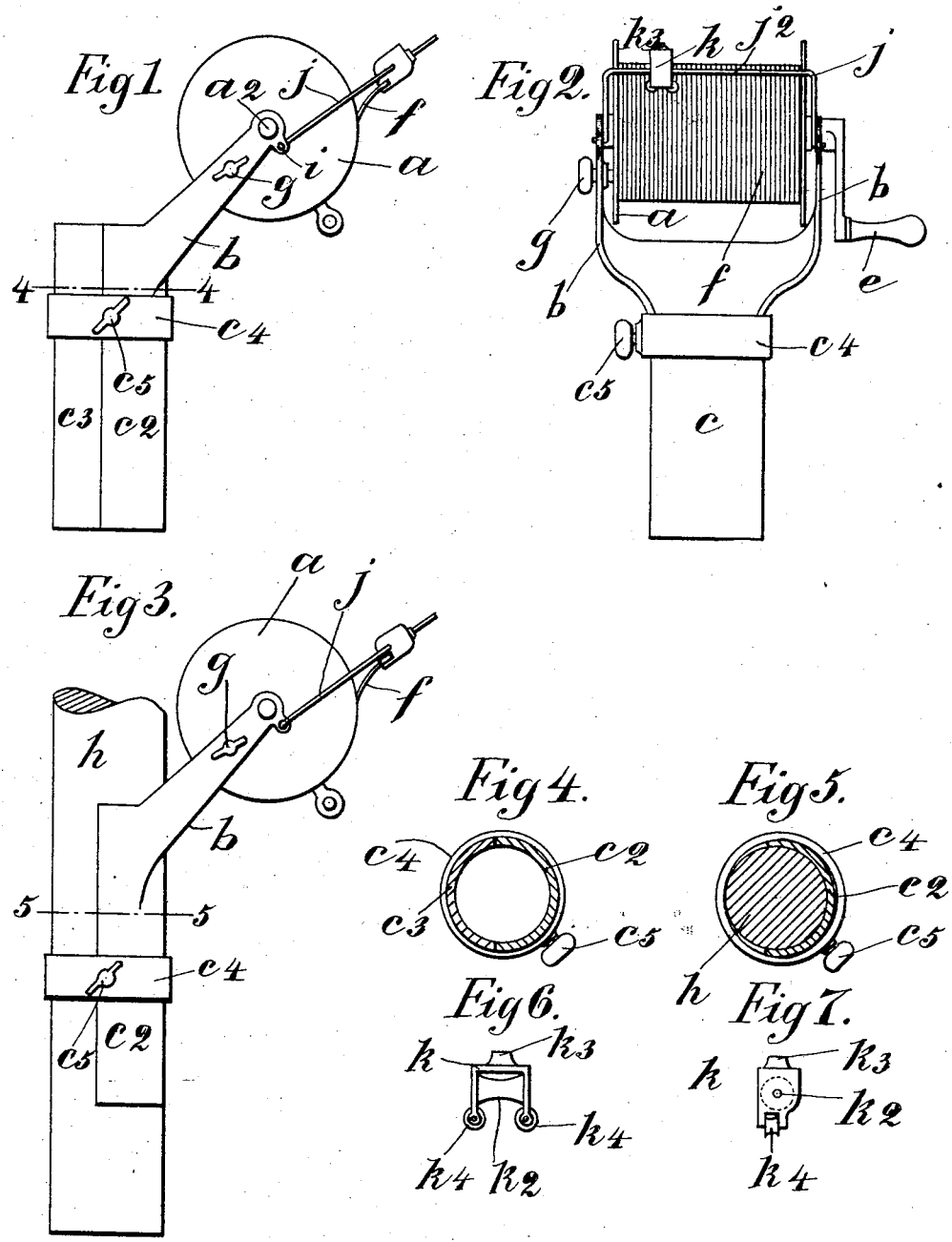

UNITED STATES PATENT OFFICE.

CARL STOLHANDSKE, OF BROOKLYN, NEW YORK.

FISH-LINE REEL.

SPECIFICATION forming part of Letters Patent No. 782,882, dated February 21, 1905.

Application filed November 20, 1903. Serial No. 181,899.

*To all whom it may concern:*

Be it known that I, CARL STOLHANDSKE, a citizen of the United States, residing at Brooklyn, in the county of Kings and State of New York, have invented certain new and useful Improvements in Fish-Line Reels, of which the following is a specification, such as will enable those skilled in the art to which it appertains to make and use the same.

The object of this invention is to provide an improved fish-reel which is primarily designed to be held in the hand and used as an ordinary hand-reel in deep-sea fishing, but which also when desired may be attached to an ordinary fish pole or rod and used in the usual manner.

The invention is fully disclosed in the following specification, of which the accompanying drawings form a part, in which the separate parts of my improvement are designated by suitable reference characters in each of the views, and in which—

Figure 1 is a side view showing my improved fish-reel adapted to be held in the hand; Fig. 2, a view at right angles to Fig. 1; Fig. 3, a view similar to Fig. 1, showing the device applied to a fish pole or rod; Fig. 4, a section on the line 4 4 of Fig. 1; Fig. 5, a section on the line 5 5 of Fig. 3; Fig. 6, a side view of a line-guide which I employ in connection with the reel, and Fig. 7 a view thereof at right angles to Fig. 6.

In the practice of my invention I provide a reel $a$, which is mounted in a yoke $b$, provided with a tubular handle $c$, composed of two parts $c^2$ and $c^3$, held together by a band $c^4$, provided with a set-screw $c^5$. The handle $c$ is tubular in form and is divided longitudinally to form the parts $c^2$ and $c^3$ thereof, and these parts may be connected in any desired manner; but for all practical purposes the band $c^4$ will hold them in proper position.

The reel $a$ is provided with the usual central shaft $a^2$, which passes through the sides of the yoke $b$ and one end of which is provided with a crank $e$, by which the line $f$ may be wound on said reel, and the side of the yoke $b$ opposite the crank $e$ is provided with a thumb-screw $g$, the inner end of which is adapted to bear on one end of the reel $a$, so as to prevent the turning thereof.

One part of the handle $c$ is formed integrally with the yoke $b$, and whenever it is desired to use this device on a pole, as shown at $h$ in Fig. 3, the other part of said handle is detached, and the part which is connected with the yoke $b$ is placed on the side of the pole, as shown in Figs. 1 and 2, and secured thereto by the band $c^4$ and the screw $c^5$, which forms a clamp.

Pivoted to the end of the sides of the yoke $b$, as shown at $i$, is a small yoke $j$, composed of wire or other suitable material, and the cross-head $j^2$ thereof extends transversely of the reel $a$ and is provided with a slide $k$, comprising a yoke-shaped device having an antifriction-roller $k^2$ and the cross-head of which is provided with an eye $k^3$, and in practice the line is passed through the eye $k^3$ formed in the cross-head portion of the slide and around or over the antifriction-roller $k^2$, and the arms or sides of the yoke-shaped slide $k$ are provided at the ends with the antifriction-rollers $k^4$, which are preferably provided with peripheral grooves. My invention is in no way limited, however, to the construction of the slide $k$ nor to the mounting thereof, and changes in and modifications of the other parts of the device herein shown and described may be made without departing from the scope of my invention or sacrificing its advantages.

When the device is detached from the pole and the separate parts of the handle $c$ connected, it may be used as an ordinary hand-reel particularly adapted for use in deep-water fishing, and the device is shown in this form in Figs. 1 and 4, and whenever necessary or desirable the said device may be attached to a pole, as shown in Fig. 3, and used in the ordinary manner.

It will be observed that the yoke $b$ in the form of construction shown is at an angle to the handle of about forty-five degrees, so as to adapt the device to be connected with a pole; but if the device is intended for use only as a hand-reel the yoke $b$ may project in line with the part $c^2$ of the handle, and the yoke may also project in line with the part $c^2$ of the handle when the device is attached to a pole; but in this event the parts would have to be turned around and the end of the pole inserted into the handle of the yoke $b$.

Having fully described my invention, what I claim as new, and desire to secure by Letters Patent, is—

1. A device of the class described, comprising a yoke provided with a tubular handle composed of two parts, separable longitudinally, a clamp for holding said parts together, and a reel mounted in the yoke, substantially as shown and described.

2. A device of the class described, comprising a yoke connected with a tubular handle composed of two parts separable longitudinally, a clamp for holding said parts together, a reel mounted in the yoke, said reel being also provided with a supplemental yoke pivoted to the sides of the first-named yoke and a line-guide mounted on the supplemental yoke, substantially as shown and described.

3. A device of the class described, comprising a yoke provided with a tubular handle divided longitudinally into two separate parts, said yoke being connected with one of said parts and extending laterally therefrom, and a reel mounted in said yoke, substantially as shown and described.

4. A device of the class described, comprising a yoke provided with a tubular handle divided longitudinally into two separate parts, said yoke being connected with one of said parts and extending laterally therefrom, and a reel mounted in said yoke and provided with a line-guide mounted longitudinally thereof, substantially as shown and described.

5. A device of the class described, comprising a yoke provided with a tubular handle divided longitudinally into two similar parts, and a reel mounted in said yoke, substantially as shown and described.

6. A device of the class described, comprising a yoke provided with a tubular handle divided longitudinally into two separable parts with one of which the yoke is connected, said yoke projecting laterally from said handle, and means for securing the parts of the handle together, substantially as shown and described.

In testimony that I claim the foregoing as my invention I have signed my name, in presence of the subscribing witnesses, this 9th day of November, 1903.

CARL STOLHANDSKE.

Witnesses:
F. A. STEWART,
C. E. MULREANY.